United States Patent
Raffman et al.

[11] Patent Number: 5,835,787
[45] Date of Patent: Nov. 10, 1998

[54] SYSTEM FOR BI-DIRECTIONALLY TRANSFERRING A DIGITAL SIGNAL SAMPLE FROM A CODEC TO A PARTICULAR MEMORY LOCATION AND A SECOND SAMPLE FROM MEMORY TO CODEC

[75] Inventors: Andrew Richard Raffman, Bridgewater; Jeffrey Alan Walck, Lebanon, both of N.J.

[73] Assignee: Lucent Technologies, Inc., Murray Hill, N.J.

[21] Appl. No.: 271,934

[22] Filed: Jul. 7, 1994

[51] Int. Cl.[6] .................................................. G06F 13/00
[52] U.S. Cl. ........................... 395/841; 395/842; 395/889
[58] Field of Search .................................... 395/821, 824, 395/827, 840, 842, 873; 364/939, 939.5, 939.81, 944.7

[56] References Cited

U.S. PATENT DOCUMENTS

| | | | |
|---|---|---|---|
| 3,617,719 | 11/1971 | Wong et al. | 364/736 |
| 4,309,755 | 1/1982 | Lanty | 364/200 |
| 4,453,229 | 6/1984 | Schaire | 395/250 |
| 4,599,708 | 7/1986 | Schuster | 365/189 |
| 4,734,850 | 3/1988 | Torii et al. | 364/200 |
| 4,736,394 | 4/1988 | Giovannelli et al. | 375/121 |
| 4,800,483 | 1/1989 | Yamamoto et al. | 364/200 |
| 4,829,514 | 5/1989 | Frimmel, Jr. et al. | 370/58 |
| 4,852,045 | 7/1989 | Kraul et al. | 364/900 |
| 4,858,111 | 8/1989 | Steps | 364/200 |
| 4,920,480 | 4/1990 | Murakami et al. | 395/800 |
| 5,121,479 | 6/1992 | O'Brien | 395/250 |
| 5,155,824 | 10/1992 | Edenfield et al. | 395/425 |
| 5,197,144 | 3/1993 | Edenfield et al. | 395/425 |
| 5,291,609 | 3/1994 | Herz | 395/725 |
| 5,297,231 | 3/1994 | Miller | 395/2.1 |
| 5,299,315 | 3/1994 | Chin et al. | 395/250 |
| 5,479,636 | 12/1995 | Vanka et al. | 395/460 |
| 5,495,246 | 2/1996 | Nichols et al. | 341/155 |
| 5,504,916 | 4/1996 | Murakami et al. | 395/800 |
| 5,513,374 | 4/1996 | Baji | 395/846 |
| 5,553,220 | 9/1996 | Keene | 395/154 |
| 5,584,010 | 12/1996 | Kawai et al. | 395/444 |

OTHER PUBLICATIONS

Crystal Semiconductor Corporation, Austin, TX, Sep. 1993, Draft #CDB4231/4248 CS4231/4248 Evaluation Board, pp. 1–3.

Crystal Semiconductor Corporation, Austin, TX, Jan. 1993, CS4248, Parallel Interface, Multimedia Audio Codec, pp. 1–33, DS106PP1.

"Design of an EISA System Motherboard Containing an 80486 and an AT&T DSP3210 Digital Signal Processor", J. A. Walck, AT&T Microelectronics, pp. 1–13.

Kenneth Short, Microprocessors and Programmed Logic, Prentice Hall, 1981, pp. 298–308.

*Primary Examiner*—Thomas C. Lee
*Assistant Examiner*—Anderson I. Chen

[57] ABSTRACT

A bi-directional digital signal processing system comprises: a memory including a memory buffer of a predetermined size; a CODEC unit; and a bi-directional digital signal interface. The interface is adapted to be coupled to the memory and the CODEC and is further adapted to at least bi-directionally transfer digital signal samples from and to one selected memory location in the memory buffer.

16 Claims, 2 Drawing Sheets

SYSTEM FOR BI-DIRECTIONALLY TRANSFERRING A DIGITAL SIGNAL SAMPLE FROM A CODEC TO A PARTICULAR MEMORY LOCATION AND A SECOND SAMPLE FROM MEMORY TO CODEC

TECHNICAL FIELD

This invention relates to digital signal processing and, more particularly, to bi-directionally transferring digital signals.

BACKGROUND OF THE INVENTION

Analog-to-digital conversion has a variety of applications, including, for example, digitized audio, telephony, and use in connection with other digitized analog signals in computers, personal computers, and signal processing equipment. Typically, such digitized or digital signals take the form of digital signal samples or digital signal sample values of an analog waveform that may be used later to construct or reconstruct the analog waveform. To do this, the digital signal samples are presented to a digital-to-analog converter (DAC) typically at a periodic rate (e.g., 44,100 samples per second in a typical audio application). Likewise, an analog waveform may be sampled and converted to a digital signal by an analog-to-digital converter (ADC) typically at a periodic rate, for storage or processing of the signal sample values now made available in digital form.

These digital signal samples or sample values are typically stored in a memory unit, such as a random access memory (RAM), prior to being presented or output to the DAC or after being input or received from the ADC. Depending upon the particular memory, the digital signal samples may be stored as an 8-bit, a 12-bit, a 16-bit, or another bit-sized digital signal sample, and that digital signal sample may then be accessed from the RAM, typically in a single memory operation; that is, all bits or binary signal sample values forming the digital signal sample may be made available at once. Such a memory operation is often referred to as obtaining the binary signal sample values "in-parallel." Typically, a device known as a direct memory access (DMA) controller steps through or accesses the memory locations of the RAM at a periodic rate either to store or write such signal sample values to particular or selected memory locations or to fetch or read such signal sample values from particular or selected memory locations.

In digital signal processing it has also become common to combine the ADC and DAC in a single device referred to as a CODEC, for coder-decoder. Likewise, it is typical, although not required, for CODECs to have serial digital signal input and output ports in contrast with the RAM, which typically has a parallel port for input-output operations, as previously described. Thus, the digital signal samples, typically stored in binary format, may be shifted in or out of the CODEC, i.e., written to or read from the CODEC, using a pin or coupling for input and a pin or coupling for output where each binary signal sample or sample value of the digital signal is accessible from or to the appropriate pin for a relatively short period of time, known as time-division multiplexing (TDM). Thus, a serial port or interface may be used in this context because it reduces the number of separate pins for the CODEC in comparison with a parallel port, resulting in a lower cost device.

Regardless of the type of input-output operations performed by the CODEC, it has become more common to connect two DMA controllers to a CODEC to perform bi-directional digital signal processing, although additional parallel-to-serial and serial-to-parallel conversion considerations may apply where a CODEC having serial ports is employed. Due to the marginal cost of additional memory space, a need exists for an interface between the RAM and the CODEC that is not only bi-directional, but also makes efficient use of the available space in the memory.

SUMMARY OF THE INVENTION

Briefly, in accordance with one embodiment of the invention, a bidirectional digital signal processing system comprises: a memory including a memory buffer of a predetermined size; a CODEC; and a bi-directional digital signal interface. The interface is adapted to be coupled to the memory and the CODEC and is further adapted to bi-directionally transfer digital signal samples from and to at least one selected memory location in the memory buffer, typically in successive memory transfer operations. During digital signal processing, the interface, therefore, has the capability to employ the same physical memory buffer location both to transfer digital signal samples from the memory buffer to the CODEC and to transfer digital signal samples from the CODEC to the memory buffer.

BRIEF DESCRIPTION OF THE DRAWINGS

The subject matter regarded as the invention is particularly pointed out and distinctly claimed in the concluding portion of this specification. The invention, however, both as to organization and method of operation, together with objects, features, and advantages thereof, may be best understood by reference to the following detailed description when read with the accompanying drawings in which:

DETAILED DESCRIPTION

Figure 1:
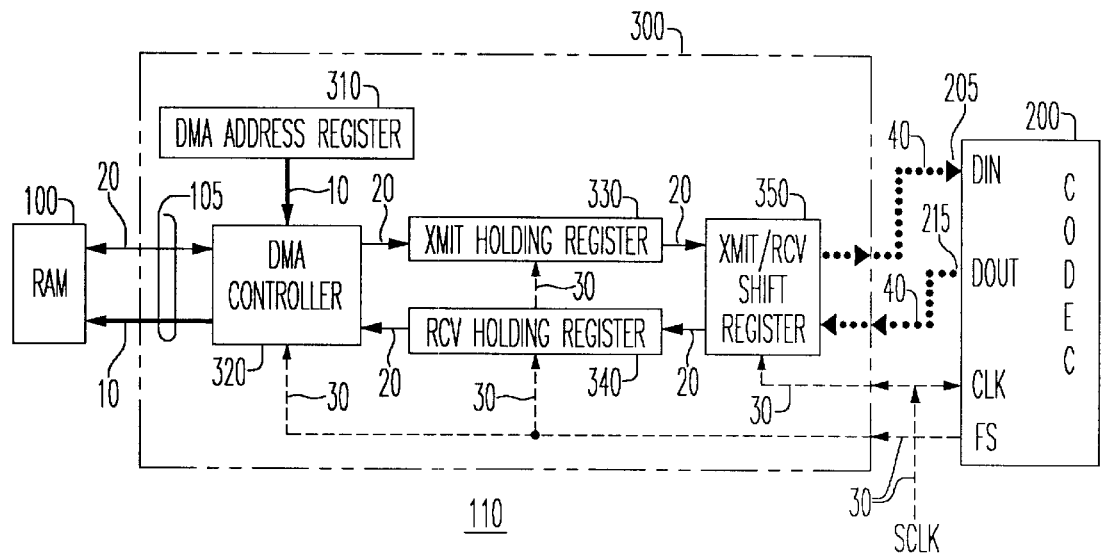
FIG. 1 is a block diagram illustrating one embodiment of a bidirectional digital signal processing system in accordance with the invention.

FIG. 1 is a block diagram illustrating one embodiment of a bidirectional digital signal processing system in accordance with the invention. As illustrated in FIG. 1, bi-directional digital signal processing (DSP) system 110 comprises a memory 100, such as a random access memory (RAM), including an input-output port for transferring digital signal samples in parallel into and out of memory locations, such as memory locations of a memory buffer of a predetermined size in memory 100; a CODEC 200, including, in this particular embodiment, a serial input port 205, DIN, and a serial output port 215, DOUT; and a bi-directional digital signal interface 300. As illustrated in FIG. 1, in this particular embodiment interface 300 is adapted to be coupled to the parallel input-output port of memory 100 and to the serial ports of CODEC 200. FIG. 1 illustrates, for example, a memory bus 105 including an address bus and a data bus coupling to the RAM input-output port. Interface 300 is adapted to bi-directionally transfer digital signal samples from and to a selected memory location in the memory buffer in memory 100, typically in successive memory transfer operations and in a relatively short period of time. In this context, the bi-directional transfer of digital signal samples from and to a selected memory location refers to reading a stored digital signal sample from a particular memory location for transfer to the CODEC and then writing another digital signal sample obtained from the CODEC to that same physical memory location thereafter. Likewise, as explained in more detail hereinafter, interface 300 is further adapted to perform bi-directional parallel-to-serial digital signal sample conversion substantially simultaneously in this particular embodiment. In this context, substantially simultaneous bi-directional parallel-to-serial conversion refers to parallel-to-serial conversion of a digital signal sample being transmitted in one signal flow direction, such as from interface 300 to CODEC 200, while substantially simultaneously serial-to-parallel conversion of a digital signal sample being transmitted in an opposite signal flow direction, such as from CODEC 200 to interface 300 is also occurring.

The bi-directional interface 300 illustrated in FIG. 1 may be conveniently embodied in a single integrated circuit chip, although the invention is not necessarily restricted in scope in this respect. As illustrated in FIG. 1, interface 300 comprises a direct memory access (DMA) controller 320 coupled to a DMA address register 310. In FIG. 1, arrows demonstrate the flow of signal information in a DSP system 110. Thick solid arrows 10 illustrate the flow of address signals, thin solid arrows 20 illustrate the flow of data signals occurring in parallel, dashed thin arrows 30 illustrate the flow of control or timing signals, and thick dotted line arrows 40 illustrate the flow of data signals occurring serially, although the invention is not restricted in scope to this particular signal flow scheme.

As illustrated by the arrows in FIG. 1, memory addresses are provided to controller 320 by DMA address register 310. Likewise, FIG. 1 illustrates a "transmit" holding register 330 and a "receive" holding register 340 respectively coupled to receive digital signal samples from and provide digital signal samples to DMA controller 320. As previously suggested, this signal flow is illustrated by the arrows in FIG. 1 in which the digital signal samples are transferred in parallel from controller 320 to and from registers 330 and 340, respectively. As illustrated in FIG. 1, in this particular embodiment interface 300 also includes a shift register 350 coupled to respectively provide digital signal samples to and receive digital signal samples from the receive and transmit holding registers 340 and 330. As previously suggested, this flow of signal information is illustrated in FIG. 1 by the arrows in which digital signals or signal samples are transferred in parallel between the holding registers and the shift register. Likewise, as illustrated in FIG. 1, shift register 350 is further adapted to be coupled to CODEC 200 so as to provide digital signal samples to and receive digital signal samples from CODEC 200 serially. CODEC 200 may comprise, for example, an AT&T 7525 Telephone CODEC, although the scope of the invention is not limited in this respect. Thus, digital signals are transferred a single bit at a time, or a binary digital signal sample at a time between shift register 350 and CODEC 200 over each serial port.

FIG. 1 also illustrates control signals, such as externally-derived clock pulses, to synchronize the timing of the transfer of digital signal samples between memory 100 and CODEC 200. In the embodiment illustrated in FIG. 1, the clock signal, SCLK, is derived externally and provided to CODEC 200 and interface 300. Interface 300 provides a clock timing signal to shift register 350 based on SCLK, and CODEC 200 provides a timing signal, frame synchronization (FS), to interface 300 based on SCLK, although the invention is not limited to having an externally-derived clock signal or having it provided in this respect. In a digital signal processing system in accordance with the invention, the timing signals may be handled any one of a number of ways. For example, the FS signal may be derived from interface 300 and provided to CODEC 200. Likewise, CODEC 200 and interface 300 may alternatively each include separate, mutually synchronized clocks. In this embodiment CODEC 200 provides the frame synchronization (FS) signal to mark or signal the dividing point between consecutive words of digital signals, or digital signal samples, provided in a serial digital signal sample format.

A bi-directional digital signal processing system in accordance with the invention, such as the embodiment illustrated in FIG. 1, provides several advantages. For example, such a bi-directional digital signal processing system reduces the amount of random access memory (RAM) required for the storage of digital signal samples and the amount of hardware or circuitry required for the serial port and the DMA controller. As will be explained in more detail hereinafter, the former advantage is achieved by employing the same physical memory locations for both the digital signal samples to be stored in the memory locations and for the digital signal samples to be transferred out of the memory locations. The latter advantage is achieved by sharing a single shift register, such as register 350 in FIG. 1, for digital signal samples to be input from and for digital signal samples to be output to the CODEC and, likewise, by sharing address pointers and signaling circuitry in the DMA controller. In this embodiment, these advantages may be achieved by exploiting the bi-directional nature of the parallel-to-serial conversion to be performed. In such a bi-directional system, the input and output digital signal sampling rates may be the same, the amount of memory storage required for storing the digital signal samples may be the same, and the size and shift rate of the input and output shift registers may be the same. Thus, the flow of digital signal samples in both directions, i.e., from memory to the CODEC and from the CODEC to memory, may operate in lock step with each other and efficiency may result from utilizing the same memory buffer and only one shift register for such bi-directional operations.

For the embodiment illustrated in FIG. 1, controller 320 transfers digital signal samples between the memory buffer in RAM 100 and holding registers 330 and 340. Digital signal samples are read from memory locations in the memory buffer and transferred to register 330. Likewise, digital signal samples are transferred or read from register 340 and written to the memory locations in the memory buffer. As previously suggested, in this embodiment the controller supports immediately successive output and input of digital signal samples from the memory buffer. These operations result at least in part from the bi-directional nature of the digital signal processing being performed and because the output and input memory buffer for the DMA channel utilizes the same physical memory buffer in random access memory. Likewise, for the embodiment illustrated in FIG. 1, the input and output signal samples also share a single shift register at the serial port permitting substantially simultaneous bi-directional parallel-to-serial conversion of digital signal samples.

It will nonetheless be appreciated that a bi-directional digital signal processing system in accordance with the invention is not limited in scope to the particular embodiment illustrated in FIG. 1. For example, alternatively a CODEC employing a parallel port rather than a serial port may be employed, such as, for example, the ANALOG DEVICES 1848 CODEC or a similarly compatible CODEC. In such an alternative embodiment, shift register 350 is not required, and advantages may nonetheless be achieved by using a bi-directional digital signal processing system in accordance with the invention in which digital signal samples are transferred bi-directionally from and to the same physical memory location in the RAM, as previously described.

Although the invention is again not limited in this respect, the embodiment illustrated in FIG. 1 may be employed to transfer, for example, digital signal samples comprising 16 binary signal values, or 16-bit samples. For such digital signal samples, the DMA controller may transfer a single 16-bit sample at a time. In one particular embodiment, for example, the memory may be capable of supporting an 8-KHz sampling rate. Likewise, the memory buffer size may be set at 1-kilobyte, for example, and may be used either as a circular or ping-pong buffer, depending on the particular embodiment, such as described, for example, in Chapter 5 of *Data Management and File Processing*, written by Mary E. S. Loomis, and available from Prentice-Hall, Inc. (1983), or in "The Secrets of DMA," an article by Benjamin Sidle, available from Process Communications, Ltd. (1993), both herein incorporated by reference. Although the starting address of the buffer may be determined by a separate address register (not shown), the current location of the memory buffer being accessed by the DMA controller in the embodiment illustrated in FIG. 1 is controlled by DMA address register 310. An embodiment employing a separate address register may result in hardware savings, where, for example, several interface units are employed in a single DSP system, and the memory buffers for each interface are located in relatively close proximity in memory so that the starting address for each buffer has the same bit or binary values for a predetermined portion of the address.

For each digital signal sample, a bi-directional digital signal processing (DSP) system in accordance with the invention, such as the embodiment illustrated in FIG. 1, may be operated in accordance with the following method. A digital signal sample may be read or transferred serially from CODEC 200 to shift register 350, such as via DOUT in FIG. 1. Likewise, substantially simultaneously a digital signal sample may be serially transferred from register 350 to CODEC 200, such as via DIN. In an alternative embodiment, a sample may be read or transferred to a register in parallel. A digital signal sample that has been previously read or transferred in parallel from memory is contained or stored in transmit holding register 330. The digital signal sample read or obtained from CODEC 200 may be moved or transferred to receive holding register 340 from shift register 350, or from another register if a shift register is not employed. The digital signal in transmit holding register 330 may be moved or transferred to shift register 350, or to another register if a shift register is not employed, from transmit holding register 330. DMA controller 320 may then request or signal for access to RAM 100. In an environment in which several devices may be attempting to access memory at any given time, this may typically be performed through a well-known arbiter (not shown) that prioritizes the requests and then employs a DMA controller, such as 320, to access memory via the data and address buses. Such an arbiter is described, for example, in an application note titled "3-bit Arbiter," written by Sadahiro Horiko, and appearing in *System Design Handbook*, 2d Ed., available from Monolithic Memories, Inc., or in "Design of EISA System Motherboard Containing An 80486 And An AT&T DSP3210 Digital Signal Processor," written by Jeffrey Walck and published in Volume II of the Conference Proceedings of the Silicon Valley Personal Computer Design Conference (SVPC '92), held Aug. 10–12, 1992, both of which are herein incorporated by reference. It will, of course, be appreciated that many different implementations may be employed to access memory and the invention is not limited in scope to any particular implementation. Once access to memory is obtained, the next digital signal sample to be obtained from memory may now be moved or transferred from the current particular memory location in the memory buffer to transmit holding register 330. Likewise, the digital signal sample previously obtained from CODEC 200 may be moved or transferred from receive holding register 340 to the particular memory location in the memory buffer.

In accordance with the previous steps, in the embodiment illustrated in FIG. 1, once the frame synchronization (FS) signal becomes active, the binary signal values for the particular digital signal sample stored in shift register 350 are transferred to receive holding register 340, and the binary signal values for the particular digital signal sample stored in the transmit holding register 330 are transferred to shift register 350. The DMA controller then signals for access to memory 100, as previously described. Once controller 320 obtains access to memory, and therefore, has control of the memory bus, it first transfers or copies the digital signal sample from the address and memory location specified by DMA address register 310 to transmit holding register 330. It then transfers or copies the digital signal sample in receive holding register 340 to that same memory location and then relinquishes control of the memory bus 105. Finally, in this particular embodiment, the DMA controller increments the memory location address in the DMA address register. The process may repeat at the next active FS signal. Likewise, depending on circuitry internal to the DMA controller, if the address register ultimately "wraps around" to zero, various actions may be signaled to take place such as either disabling of the DMA controller or waiting for the next FS signal to repeat the process previously described.

In the particular embodiment illustrated in FIG. 1, when DMA controller 320 is accessing memory 100, the binary signal values in shift register 350 may be "shifted" out to CODEC 200, and binary signal values may be shifted into shift register 350 from CODEC 200 substantially simultaneously. This technique provides substantially simultaneous bi-directional parallel-to-serial conversion, as previously described. For example, where the digital signal sample comprises 16 binary signal values, the CODEC may shift 16 bits or binary signal values. As illustrated in the embodiment in FIG. 1, shift register 350 is clocked by a timing signal obtained from the the CODEC. It will now be appreciated that in this embodiment when shift register 350 has shifted all binary signal values to be output and obtained the binary signal values to be input, it is desirable to transfer the digital signal sample to the receive holding register. Thus, shift register 350 may then obtain another digital signal sample from the transmit holding register before commencing processing of the first bit of the next digital signal sample to be obtained from the CODEC. Thus, once the FS signal has become active, it is desirable for the DMA controller to transfer the digital signal samples between the holding registers and the memory buffer before the next FS signal.

Figure 3:
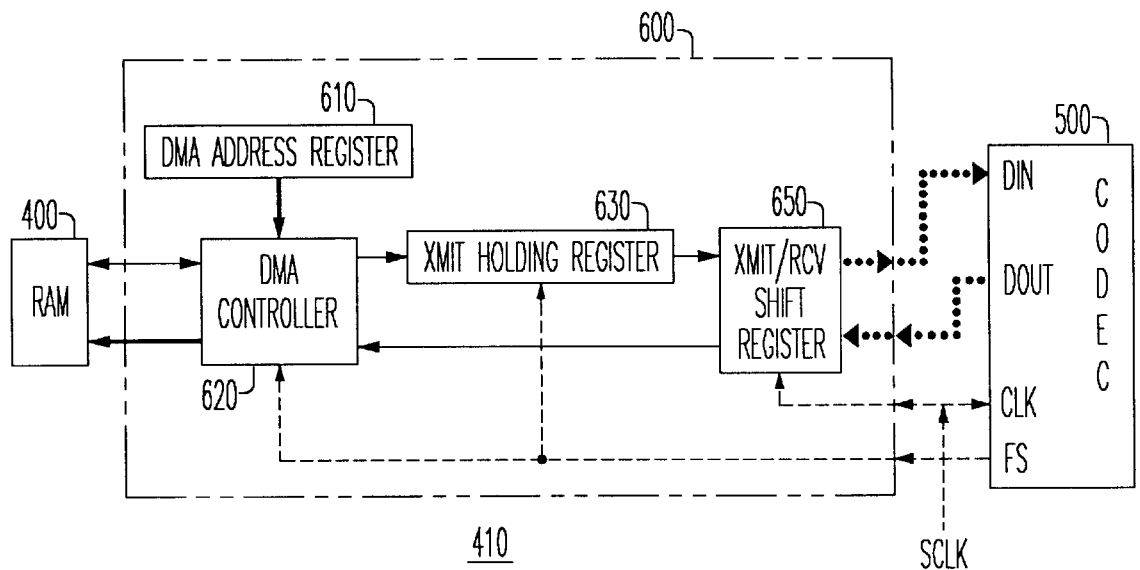
FIG. 3 is a schematic diagram illustrating an alternative embodiment of a bi-directional digital signal processing system in accordance with the invention.

FIG. 3 illustrates a schematic diagram of an alternative embodiment 410 of a bi-directional digital signal processing system in accordance with the invention. In this particular embodiment, interface 600 is adapted to be coupled to an AT&T 7525 CODEC, although, as previously suggested, the invention is not limited in scope in this respect. In a particular embodiment in which the CODEC clock signal or other clock runs at 2.048 MHz, for example, which is 256 times faster than an 8 KHz sampling rate, for example, such an embodiment may have 256 bit shift "periods" between 8 KHz samples. Likewise, the shift register is active only during the first 16 bit periods after an FS signal becomes active. In such an embodiment, the DMA controller has 240 bit periods, or approximately 117 microseconds for a typical hardware implementation, to transfer digital signal samples between memory and the shift register.

As illustrated in FIG. 3, in comparison with FIG. 1, in such an embodiment receive holding register 340 may be omitted. One reason register 340 in FIG. 1 may be omitted is due to the sufficiently long time period available for the DMA controller to transfer a digital signal sample from shift register 650 to memory directly. Thus, in this embodiment, based on the FS signal, shift register 650 will substantially simultaneously "shift-in" and "shift-out" from CODEC 500 16 binary signal sample values or bits. After this operation is completed, DMA controller 620 is signaled and will have 240 clock cycles in this particular embodiment to perform the necessary memory operations. First, a digital signal sample in a particular memory location in the memory buffer is transferred to holding register 630. Then the digital signal sample in shift register 650 is transferred to the same particular memory location in the memory buffer. Finally, the digital signal sample in holding register 630 is then transferred to shift register 650 to then be shifted or transferred into the CODEC based on the next FS signal.

Likewise, in contrast with the previous description of a method of operating a bi-directional digital signal processing system in accordance with the invention, such as the embodiment illustrated in FIG. 1, in the alternative embodiment illustrated in FIG. 3 instead of transferring the digital signal samples stored in the shift register, previously obtained from the CODEC, to another register, such as receive holding register 340 in FIG. 1, the digital signal sample stored in the shift register, such as in register 650 in FIG. 3, may be transferred directly to the particular memory location in memory, as previously described.

Figure 4:
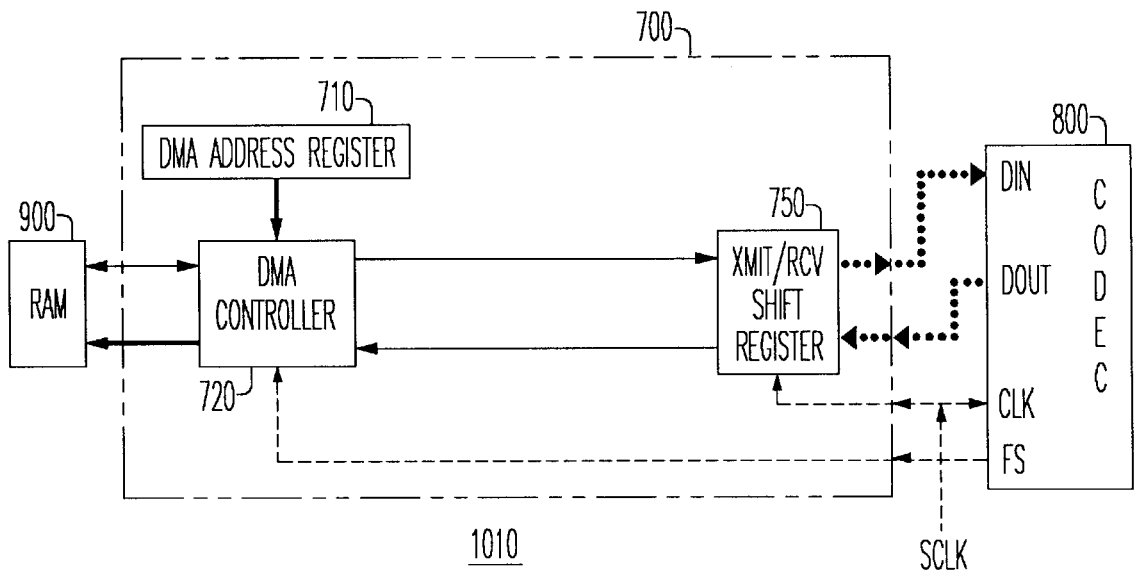
FIG. 4 is a schematic diagram illustrating another alternative embodiment of a bi-directional digital signal processing system in accordance with the invention.

FIG. 4 illustrates a schematic diagram of another alternative embodiment 1010 of a bi-directional digital signal processing system in accordance with the invention. In this particular embodiment, as with the previously described embodiments, interface 700 is adapted to be coupled to an AT&T 7525 CODEC, although, again, the invention is not limited in scope in this respect. For the embodiment illustrated in FIG. 4, the transmit holding register of FIGS. 1 and 3 is omitted just as receive holding register 340 of FIG. 1 is omitted from the embodiment illustrated in FIG. 3. Again, the transmit holding register may be omitted at least in part because a sufficiently long time period in this particular embodiment is available for the DMA controller to perform its operations and because of a change in how the memory transfer operations are accomplished, as explained in more detail hereinafter.

In this particular embodiment, in an initial state, shift register 750 contains a digital signal sample obtained from CODEC 800. Likewise, a memory location in the memory buffer in memory 900, predetermined for this cycle of memory transfer operations and termed a first memory location, initially does not contain a digital signal sample to be transferred to the CODEC. Thus, once DMA controller 720 has control of the memory bus coupling to memory 900, it transfers the digital signal sample initially stored in shift register 750 to this first memory location. Next, DMA controller 720 moves a digital signal sample stored in a second or different predetermined memory location for this cycle of memory transfer operations, termed a second memory location, to shift register 750. Typically, this second memory location will be the next sequential memory location, although the invention is not restricted in scope in this respect.

Due to the transfer of a digital signal sample from memory 900 to shift register 750, this second memory location in the memory buffer is now available to store a digital signal sample to be obtained from CODEC 800, such as the next digital signal sample. Nonetheless, in an embodiment in which the second memory location described above is not the next sequential memory location, a digital signal sample other than the next digital signal sample may be stored in that second location depending on the particular memory transfer operations employed. In this particular embodiment, the next digital signal sample to be obtained from CODEC 800 is "shifted-in" to register 750 while substantially simultaneously the digital signal sample stored in shift register 750 is "shifted-out" to the CODEC, as previously described. During this period, DMA controller 720 in this embodiment will typically relinquish control of the memory bus and later reacquire control of the memory bus after shift register 750 has completed the transfer. Once DMA controller 720 reacquires the memory bus, it again performs the transfers previously described, where, in this particular embodiment, for this next cycle of memory transfer operations, the first predetermined memory location constitutes the second memory location previously described. It will now be appreciated that the technique previously described regarding the transfer of digital signal samples from and to the memory buffer is similar to the other embodiments previously described in that the digital signal sample is moved from a memory location in the buffer to shift register 750 and that after shift register 750 has obtained another digital signal sample from CODEC 800, this other digital signal sample is transferred to the same physical memory location, thereby resulting in efficiencies in the use of memory space, as previously described. Nonetheless, one difference in this embodiment regards the relinquishment of control of the memory bus by DMA controller 720. As previously described, during this relinquishment of control shift register 750 serially transfers a digital signal sample to CODEC 800 and, likewise, obtains a digital signal sample from CODEC 800 substantially simultaneously. This approach, therefore, permits utilization of the memory during this period by other devices (not shown) in the DSP system that may desire memory access.

Figure 2:
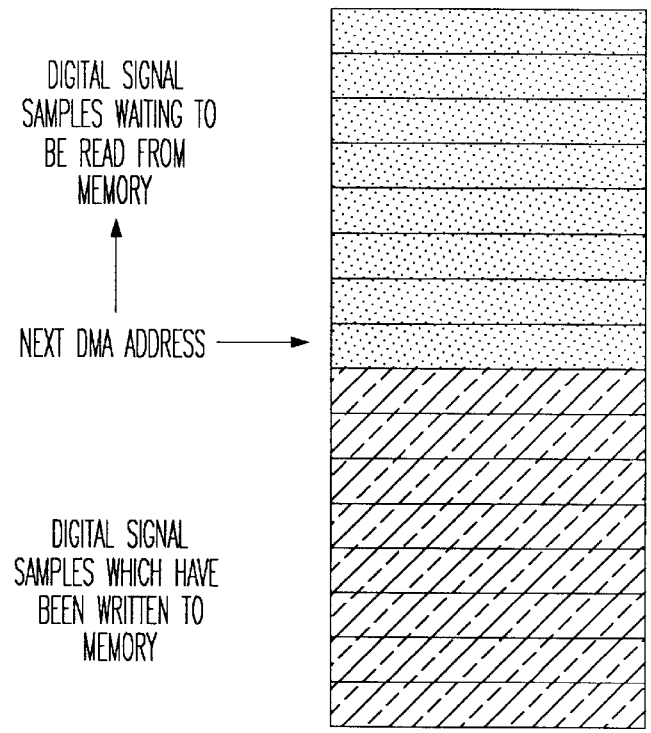
FIG. 2 is a schematic diagram illustrating a section of a Random Access Memory (RAM) buffer during the operation of an embodiment of a bi-directional digital signal processing system in accordance with the invention.

FIG. 2 is a schematic diagram illustrating the section of the memory buffer containing digital signal samples that are transferred in the manner previously described while memory access is in progress. As illustrated and previously described, in this particular embodiment, the memory locations of the memory buffer are accessed sequentially, although the scope of the invention is not limited in this respect. At each memory location, the stored digital signal sample is read or transferred out of that memory location and another digital signal sample is written into or transferred to that memory location. Although any type of memory may be employed, such as, for example, static RAM (SRAM), performance advantages may further be realized by a bi-directional digital signal processing system in accordance with the invention if a type of memory known as dynamic RAM (DRAM) is used to store the digital signal samples. Since, as previously described, an output digital signal sample is fetched or obtained from the same memory location in which an input digital signal sample is to be stored, if the read and write operations are related operationally on the DRAM bus, the operation may be performed using either page mode or a Read-Write cycle (also referred to as a Read-Modify-Write cycle), such as described, for example, in Section 1, titled "DRAM," of the *DRAM Databook* 1993, available from Micron Semiconductor, Inc., and herein incorporated by reference. These types of operations are operationally efficient and typically result in better DRAM performance than may be achieved if the memory input and output buffers were physically separate areas of DRAM. For example, whereas typically the read and write cycles would each take on the order of approximately 70 nanoseconds, for a total of 140 nanoseconds, a Read-Write cycle may be achieved in a time period on the order of 100 nanoseconds, resulting in some performance enhancement. This performance enhancement is a by-product of the fact that the DRAM is designed for efficient operation when reading and writing is performed to the same memory address location in successive memory transfer operations using a Read-Write cycle. Likewise, performance enhancement may be achieved when page mode is employed for those embodiments in accordance with the invention that include a sequence of memory transfer memory operations occurring to memory locations having a relatively close proximity. For example, for the embodiment illustrated in FIG. 4, a "write" to a first predetermined memory location is followed immediately by a "read" from a second predetermined memory location in relatively close proximity, as previously described.

While only certain features of the invention have been illustrated and described herein, many modifications, substitutions, changes or equivalents will now occur to those skilled in the art. It is, therefore, to be understood that the appended claims are intended to cover all such modifications and changes as fall within the true spirit of the invention.

We claim:

1. A method of bi-directionally transferring digital signal samples between a memory and a CODEC comprising the steps of:

transferring a first digital signal sample from the CODEC to a first register;

transferring a second digital signal sample from a particular memory location in the memory to a second register in parallel;

transferring the first digital signal sample from the first register to a third register;

transferring the second digital signal sample from the second register to the first register; and transferring the first digital signal sample from the third register to the particular memory location in memory.

2. The method of claim 1, wherein the step of transferring a digital signal sample from the CODEC to a first register comprises serially transferring the digital signal sample.

3. The method of claim 1, and further comprising the step of serially transferring the second digital signal sample from the first register to the CODEC while substantially simultaneously serially transferring a third digital signal sample from the CODEC to the first register.

4. A method of bi-directionally transferring digital signal samples between a memory and a CODEC comprising the steps of:

transferring a first digital signal sample from a particular memory location in the memory to a register;

serially transferring the first digital signal sample from the register to the CODEC while substantially simultaneously serially transferring a second digital signal sample from the CODEC to the register; and transferring the second digital signal sample from the register to the particular memory location in memory.

5. A bi-directional digital signal processing system comprising:

a memory including a memory buffer of a predetermined size;

a CODEC; and a bi-directional digital signal interface adapted to be coupled to said memory and said CODEC;

said interface comprising a direct memory access (DMA) controller for transferring a first digital signal sample from a selected memory location in the memory buffer and for transferring a second digital signal sample from the CODEC to the selected memory location in the memory buffer.

6. The bi-directional digital signal processing system of claim 5, wherein said interface is further adapted to at least bi-directionally transfer digital signal samples from and to one selected memory location in the memory buffer in successive memory transfer operations.

7. The bi-directional digital signal processing system of claim 6, wherein said memory includes an input-output port for transferring digital signal samples into and out of memory locations in parallel;

said interface being adapted to be coupled to the memory parallel port.

8. The bi-directional digital signal processing system of claim 7, wherein said CODEC includes a serial input port and a serial output port;

said interface being adapted to be coupled to the CODEC serial ports;

said interface being further adapted to perform bi-directional parallel-to-serial digital signal conversion substantially simultaneously.

9. The bi-directional digital signal processing system of claim 8, wherein said interface comprises means for performing bi-directional parallel-to-serial digital signal conversion substantially simultaneously.

10. The bi-directional digital signal processing system of claim 9, wherein said bi-directional conversion means comprises:

said DMA controller being adapted to be coupled to said memory so as to transfer digital signals to and receive digital signals from said memory buffer; and a shift register coupled to said DMA controller so as to respectively transfer digital signals to and receive digital signals from said DMA controller;

said shift register being further adapted to be coupled to said CODEC so as to serially transfer digital signals to and serially receive digital signals from said CODEC substantially simultaneously.

11. The bi-directional digital signal processing system of claim 9, wherein said bi-directional conversion means comprises:

said DMA controller being adapted to be coupled to said memory so as to transfer digital signals to and receive digital signals from said memory buffer;

a holding register coupled to said DMA controller so as to receive digital signal samples from said DMA controller; and a shift register being coupled to said holding register and said DMA controller so as to respectively receive digital signal samples from said holding register and transfer digital signal samples to said DMA controller;

said shift register being further adapted so as to serially transfer digital signals to and serially receive digital signals from said CODEC substantially simultaneously.

12. The bi-directional signal processing system of claim 9, wherein said bi-directional conversion means comprises:

said DMA controller being adapted to be coupled to said memory so as to transfer digital signals to and receive digital signals from said memory buffer;

a first and second register respectively coupled to said DMA controller so as to transfer digital signal samples to and receive digital signal samples from said DMA controller; and a shift register being coupled to said first and second registers so as to respectively transfer digital signal samples to said first register and receive digital signal samples from said second register;

said shift register being further adapted to be coupled to said CODEC so as to serially transfer digital signals to and serially receive digital signals from said CODEC substantially simultaneously.

13. An integrated circuit comprising:

a bi-directional digital signal interface adapted to be coupled to a memory unit including a memory buffer of a predetermined size and to a CODEC;

said interface comprising a Direct Memory Access (DMA) controller for transferring a first digital signal sample from a selected memory location in the memory buffer and for transferring a second digital signal sample from the CODEC to the selected memory location in the memory buffer.

14. The integrated circuit of claim 13, wherein said interface is further adapted to at least bi-directionally transfer digital signal samples from and to one selected memory location in the memory buffer in successive memory transfer operations.

15. The integrated circuit of claim 14, wherein said memory includes an input-output port for transferring digital signal samples into and out of memory locations in said memory buffer in parallel;

said interface being adapted to be coupled to the memory parallel port.

16. The integrated circuit of claim 15, wherein said CODEC includes a serial input port and a serial output port;

said interface being adapted to be coupled to the CODEC serial ports;

said interface being further adapted to perform bi-directional parallel-to-serial digital signal conversion substantially simultaneously.

* * * * *